(12) United States Patent
Chen et al.

(10) Patent No.: US 12,319,033 B2
(45) Date of Patent: *Jun. 3, 2025

(54) COMPOSITE STRUCTURE

(71) Applicant: Graphene Composites Limited, Stockton-on-Tees (GB)

(72) Inventors: Sandy Chen, Balcombe (GB); Stephen Devine, Hebburn (GB)

(73) Assignee: Graphene Composites Limited, Stockton-on-Tees (GB)

( * ) Notice: Subject to any disclaimer, the term of this patent is extended or adjusted under 35 U.S.C. 154(b) by 1153 days.

This patent is subject to a terminal disclaimer.

(21) Appl. No.: 16/971,832

(22) PCT Filed: Feb. 22, 2019

(86) PCT No.: PCT/GB2019/050487
§ 371 (c)(1),
(2) Date: Aug. 21, 2020

(87) PCT Pub. No.: WO2019/162683
PCT Pub. Date: Aug. 29, 2019

(65) Prior Publication Data
US 2021/0078309 A1    Mar. 18, 2021

(30) Foreign Application Priority Data

Feb. 22, 2018 (GB) ...................................... 1802895
Feb. 22, 2018 (GB) ...................................... 1802899

(51) Int. Cl.
*B32B 27/08* (2006.01)
*A41D 13/05* (2006.01)
(Continued)

(52) U.S. Cl.
CPC .......... *B32B 27/08* (2013.01); *A41D 13/0518* (2013.01); *B32B 5/02* (2013.01);
(Continued)

(58) Field of Classification Search
None
See application file for complete search history.

(56) References Cited

U.S. PATENT DOCUMENTS

| 4,843,947 A | 7/1989 | Bauer et al. |
| 5,377,577 A | 1/1995 | Bounkong et al. |
(Continued)

FOREIGN PATENT DOCUMENTS

| CN | 101839674 A | 9/2010 |
| CN | 102015282 A | 4/2011 |
(Continued)

OTHER PUBLICATIONS

U.S. Appl. No. 16/488,174, Non-Final Office Action, Mailed on May 2, 2022, 16 pages.
(Continued)

*Primary Examiner* — Chinessa T. Golden
(74) *Attorney, Agent, or Firm* — Kilpatrick Townsend & Stockton LLP

(57) ABSTRACT

There is provided a composite structure, comprising a protective structure comprising a plurality of ballistic layers arranged as a stack; and an ancillary structure adjacent to the protective structure adapted to at least partly absorb a force acting on the protective structure. The ancillary structure comprises at least one first layer comprising an aerogel arranged to at least partly absorb a force acting on the protective structure. A part of each ballistic layer is moveable relative to at least one adjacent ballistic layer and wherein a part of each ballistic layer is connected to at least one adjacent ballistic layer so as to restrict relative movement of a part of each of the adjacent ballistic layers.

19 Claims, 4 Drawing Sheets

(51) Int. Cl.
  *B32B 5/02* (2006.01)
  *B32B 7/09* (2019.01)
  *B32B 27/12* (2006.01)
  *B32B 27/28* (2006.01)
  *B32B 27/32* (2006.01)
  *B32B 27/40* (2006.01)
  *F41H 5/04* (2006.01)

(52) U.S. Cl.
  CPC ............... *B32B 5/024* (2013.01); *B32B 7/09* (2019.01); *B32B 27/12* (2013.01); *B32B 27/281* (2013.01); *B32B 27/32* (2013.01); *B32B 27/40* (2013.01); *F41H 5/0478* (2013.01); *F41H 5/0492* (2013.01); *B32B 2250/05* (2013.01); *B32B 2255/10* (2013.01); *B32B 2255/20* (2013.01); *B32B 2255/26* (2013.01); *B32B 2262/0253* (2013.01); *B32B 2266/126* (2016.11); *B32B 2307/54* (2013.01); *B32B 2307/558* (2013.01); *B32B 2307/581* (2013.01); *B32B 2307/732* (2013.01); *B32B 2571/02* (2013.01)

(56) References Cited

U.S. PATENT DOCUMENTS

| | | |
|---|---|---|
| 2004/0132845 A1 | 7/2004 | Rhine et al. |
| 2005/0085146 A1 | 4/2005 | Farkas |
| 2012/0128983 A1 | 5/2012 | Yoon et al. |
| 2012/0189782 A1 | 7/2012 | Zafiropoulos et al. |
| 2013/0215551 A1 | 8/2013 | Bowers et al. |
| 2014/0127490 A1 | 5/2014 | Islam et al. |
| 2014/0208932 A1 | 7/2014 | Lee |
| 2014/0240921 A1 | 8/2014 | Sultenfuss et al. |
| 2014/0260937 A1 | 9/2014 | Whitaker |
| 2014/0287641 A1 | 9/2014 | Steiner, III |
| 2015/0062613 A1 | 3/2015 | Higashi |
| 2015/0065613 A1 | 3/2015 | Balijepalli |
| 2015/0198380 A1 | 7/2015 | Haj-Hariri et al. |
| 2015/0218730 A1 | 8/2015 | Dang et al. |
| 2015/0260329 A1 | 9/2015 | Bond et al. |
| 2016/0200882 A1 | 7/2016 | Bhat |
| 2016/0221303 A1* | 8/2016 | Jancar ....................... B32B 7/02 |
| 2016/0265857 A1 | 9/2016 | Benthem |
| 2016/0276056 A1 | 9/2016 | Stolyarov et al. |
| 2017/0003104 A1 | 1/2017 | Andresen |
| 2017/0028674 A1 | 2/2017 | Wadley et al. |
| 2017/0218141 A1 | 8/2017 | Nosker et al. |
| 2018/0022061 A1 | 1/2018 | Kotake et al. |
| 2018/0073841 A1 | 3/2018 | DeKort |
| 2018/0304598 A1 | 10/2018 | Drzal et al. |
| 2020/0061970 A1 | 2/2020 | Chen |
| 2021/0078309 A1 | 3/2021 | Chen |
| 2022/0081808 A1 | 3/2022 | Craig |

FOREIGN PATENT DOCUMENTS

| | | |
|---|---|---|
| CN | 105555519 A | 5/2016 |
| CN | 104848748 B | 8/2016 |
| CN | 106626676 | 5/2017 |
| CN | 107097478 | 8/2017 |
| CN | 107142037 | 9/2017 |
| CN | 206575941 | 10/2017 |
| CN | 107365497 | 11/2017 |
| CN | 107513168 | 12/2017 |
| GB | 2463454 A | 3/2010 |
| GB | 2559979 A | 8/2018 |
| KR | 20130034473 | 4/2013 |
| KR | 20140039493 | 4/2014 |
| WO | 2004018919 | 3/2004 |
| WO | 2006009921 | 1/2006 |
| WO | 2011/024011 A1 | 3/2011 |
| WO | 2012138803 | 10/2012 |
| WO | 2013148843 | 10/2013 |
| WO | 2014011108 | 1/2014 |
| WO | 2015160822 A1 | 10/2015 |
| WO | 2016015467 | 2/2016 |
| WO | 2016167714 | 10/2016 |
| WO | 2017017628 | 2/2017 |
| WO | 2017123522 | 7/2017 |

OTHER PUBLICATIONS

U.S. Appl. No. 16/488,174, Non-Final Office Action, Mailed on Oct. 25, 2021, 9 pages.
U.S. Appl. No. 16/488,174, "Restriction Requirement", Jul. 23, 2021, 8 pages.
U.S. Appl. No. 17/056,246, Non-Final Office Action, Mailed on Dec. 22, 2021, 10 pages.
U.S. Appl. No. 17/056,246, "Restriction Requirement", Sep. 24, 2021, 5 pages.
Application No. CN201880013754.7, Office Action, Mailed on Jun. 28, 2022, 17 pages.
Application No. CN201980027031.7, Office Action, Mailed on Apr. 25, 2022, 7 pages.
Application No. CN201980027668.6, Office Action, Mailed on Apr. 14, 2022, 12 pages.
GB2010741.3, "Examination Report", Jun. 18, 2021, 2 pages.
GB2016940.5, "Examination Report", May 12, 2021, 2 pages.
PCT/GB2021/051508, "Invitation to Pay Additional Fees and Where Applicable, Protest Fee", Sep. 23, 2021, 15 pages.
PCT/GB2019/050487; International Search Report; Apr. 10, 2019; 12 pages.
U.S. Appl. No. 16/971,885, Non Final Office Action dated Sep. 9, 2022.
U.S. Appl. No. 17/056,246, Non Final Office Action dated Sep. 8, 2022.
U.S. Appl. No. 16/971,885, Final Office Action dated Mar. 22, 2023.
U.S. Appl. No. 16/488,174, Final Office Action dated Jan. 31, 2023.
Office Action for Chinese Patent Application No. CN201980027668.6, dated Jun. 6, 2023.
Office Action for Chinese Patent Application No. CN201980027031.7, dated Dec. 15, 2022.
Office Action for Chinese Patent Application No. CN201980027668.6, dated Sep. 18, 2023.
U.S. Appl. No. 16/488,174, Non-Final Office Action dated Sep. 20, 2023, 23 pp.
U.S. Appl. No. 16/971,885, Non-Final Office Action dated Mar. 8, 2024. 20 pp.
U.S. Appl. No. 16/488,174, Final Office Action dated May 2, 2024, 17 pp.

* cited by examiner

COMPOSITE STRUCTURE

FIELD OF INVENTION

The present invention relates to a composite structure, in particular composite materials for reducing or preventing damage to a person or an object, for example from a projectile or a strike.

BACKGROUND TO THE INVENTION

Composite materials (or "composite structures", "composites") are used in a variety of applications across numerous different industries, including aerospace industries, ballistic protection, construction, vehicles, amongst others. Composite materials are used as the combination of different materials having different properties can lead to composite structures with significantly improved performance and which mitigate the drawbacks of some of the materials present in the composite materials. For example, fibre-glass composite is a common material used in many different industries, which is formed of a mixture of a polymer matrix and glass fibres. The addition of the glass fibres helps to avoid some of the failure modes of unreinforced polymer materials. While existing composites provide a great deal of advantageous properties, there is continuous demand for improvements and increased performance.

Some composite materials are used in articles such as bullet-proof or stab-proof vests or armour plating (e.g. on vehicles). The composite materials used in these contain materials and structures designed to protect a wearer or an object surrounded by the articles from an impact (e.g. from a projectile or blunt force) and/or from penetration (e.g. from a sharp object or projectile (e.g. bullet or shrapnel)). The articles comprise particular materials arranged in particular structures designed to provide these properties. Typical materials used in body armour include carbon-based fibres, such as para aramid fibres, glass laminates, other polymers and/or metals or alloys and ceramics. Often, articles designed for penetration resistance (from edged weapons (e.g. bladed articles), for example) also include additional penetration resistant layers, such as a metal plates or chainmail, but these can be heavy, cumbersome and offer low protection against ballistics.

Depending on the specific use of the articles in which the materials are contained, the articles will need to meet a number of secondary objectives, in addition to the primary need to protect against impact and/or penetration. For example, in the case of body armour, the materials used to prevent impact and/or penetration must be sufficient to prevent against common risks, but at the same time be light enough so that the article can be worn without impairing the wearing or without dissuading the wearer from wearing the article. Modification of the material, or use of additional materials in a composite, may allow for additional properties to be realised, such as flexibility or multi-hit protection. However, in many cases, achieving the secondary objectives leads to sacrifice of other properties, in some cases the ability of the article to protect against impact or penetration may even be reduced. Many existing armours also still are excessively heavy and/or are rigid thereby dissuading users from wearing armours. A relatively new issue that is attracting attention is the reduced performance of existing armours after being submerged in water. A number of failures of Kevlar based soft armour following contact with water have been reported.

Increasingly there is demand for effective impact and penetration protection that is not readily visible, for example so that it can be worn covertly. Where this is the case, typically the protection offered by the article is sacrificed. Moreover, drawbacks with existing materials are that the materials used in these articles are often very rigid, which prevents easy movement compromising the covert nature of the article and/or restricting a wearer's movement. For example, in an effort to improve performance of materials used in various fields, and particularly impact protection (e.g. bullet- or stab-resistant articles), manufacturers have been modifying the existing structures to make these more rigid. One common modification is to take layers formed of carbon-based fibres, such as para aramid fibres or UHMWPE, and bond them together. This is achieved by softening the resin used to hold the fibres together in a single sheet and bond the entirety of each sheet to an adjacent sheet. This creates a rigid, thicker layer, which impedes movement.

It is therefore an objective of this invention to provide a material that can provide effective impact and/or penetration protection, but which does not suffer from the drawbacks mentioned above.

SUMMARY OF THE INVENTION

In a first aspect of the invention, there is provided a composite structure, comprising a protective structure comprising a plurality of ballistic layers arranged as a stack; and an ancillary structure adjacent to the protective structure adapted to at least partly absorb a force acting on the protective structure. The ancillary structure comprises at least one first layer comprising an aerogel arranged to at least partly absorb a force acting on the protective structure. A part of each ballistic layer is moveable relative to at least one adjacent ballistic layer and wherein a part of each ballistic layer is connected to at least one adjacent ballistic layer so as to restrict relative movement of a part of each of the adjacent ballistic layers.

In other words, there is a composite structure (or "laminate structure") for protecting a user or object (e.g. from an impact and/or projectile) comprising a protective structure (or "ballistic structure" or "body") which can be used as a front face of the composite structure and an ancillary structure or body, which can be provided behind the protective structure as a backing structure assisting in absorbing or dissipating the force of the impact event. In particular, the ancillary structure is position adjacent or abutting the protective structure so that a force (e.g. a projectile, impact, vibrations) acting on the protective structure is at least partly absorbed or dissipated by the ancillary structure, particularly by the aerogel of the ancillary structure. Thus, the ancillary structure acts as an impact absorbing structure. The protective structure can thus be a ballistic and/or penetration resistant structure which is provided forward (i.e. in the direction of incoming force from the impact) of the aerogel layer(s) of the ancillary structure.

Together the protective structure and ancillary structure can prevent or significantly reduce damage from a force, such as an impact from an object, and resist penetration (e.g. from a knife or projectile). The protective structure is characterised by a plurality of ballistic layers (e.g. a high-tensile layer) arranged one of top of the other to provide a stack. Each of the ballistic layers has a part that is relatively unconstrained such that a part of it can move relative to at least some of the other layers (e.g. a first region—or a first unconstrained region) of the protective structure. In particular, relative to at least one adjacent layer, which means any ballistic layer or layers in the same stack, and optionally those immediately adjacent (i.e. those without any further intermediate layers between the layers in question, for example, those abutting the layer in question). The ballistic layers also have a part that is constrained relative to at least one of the other layers of the stack (in other words, relative to at least one adjacent layer, which means any ballistic layer or layers in the same stack, and optionally those immediately adjacent (i.e. those without any further intermediate layers between the layers in question, for example, those abutting the layer in question)), in some embodiments all of the layers of the stack and the protective structure. The constrained part is able to move to a lesser degree than the unconstrained part as a result of the connection. Thus, movement of this part or region is reduced compared to the part which remains unconnected (or connected, but not restrained to the same degree) or unrestrained. The parts are separate parts, such that one part of the ballistic layer can move to a greater degree relative to another layer compared to the other, connected part. For example, a middle or central region of the ballistic layer can be moveable relative to another adjacent ballistic layer; whereas the constrained portion may be moveable relative to this adjacent ballistic layer to a significantly lesser degree (or entirely prevented). Preferably, movement is relative to all ballistic layers in the stack/protective structure. It will be appreciated that some protective structure may include ballistic layers which cannot move relative to another adjacent layer, but which have some ballistic layers that are arranged in accordance with the invention. In a preferred embodiment, all of the layers in the protective structure (e.g. in a single stack) are ballistic layers in accordance with the invention disclosed herein.

Embodiments of such a composite structure provide a protective structure that has a significantly higher damage resistance that prior art structures, while still remaining flexible and without any significant increase in weight. In particular, the ability of a part of the composite structure to remain moveable relative to another provides the protective structure with flexibility compared to prior art structures, where all of the layers are bonded together across their entire faces. Moreover, the constraint of a part of each layer (and only a part) means that movement of a part of the layer is restricted or reduced (e.g. it has reduced relative movement), which the inventors have discovered can significantly increase the damage resistance of the protective structure. This is also particularly beneficial with the ancillary structure, which helps to absorb the impact acting on the protective layer, while using aerogels which are exceptionally light compared to their strength. As such, the composite has a dramatically increased resistance to impact and damage, but without significantly increasing the weight of the composite structure.

Without wishing to be bound by theory, it is thought that this improved effect is as a result of synergistic mechanisms. As a result of the constrained and unconstrained regions, the protective structure of the composite structure has a particular effect when struck as it reflects or 'echoes' a shockwave back towards the source of an impact. This provides a significant stopping force and counters the continued force from the impact. In particular, as an object strikes the protective structure, a shockwave is formed in the protective structure and moves outwardly. As a result of the configuration and constraint of the layers of the protective structure, this energy or force is reflected back towards the source of the shockwave (e.g. the projectile) and provides significant resistant against the force of the object impacting the composite. The shock wave is thus disrupted by internal reflections within the composite, which serves to be a significant effect in reducing the force (i.e. force dissipation). These help to defeat the object and this effectiveness of the composite structure is particularly prominent where projectiles are bullets or other fast moving projectiles. These effects are particularly pronounced where the edges (or adjacent the edges) of the ballistic layers are constrained.

In addition to this, the aerogel of the ancillary structure has significant effects on the dissipation of the force of the impact. It is understood that this occurs through macro-scale movement of the polyimide cell walls in reaction to shock-pressure waves in the composite. Accordingly, the ancillary or backing structure behind the protective structure begins to absorb a portion of the force of the impact. In particular, the ancillary structure absorbs the impact by deformation of the aerogel layer, which can be as a result of compression (the aerogel can compress significantly) and/or deflection of the aerogel layer. This leads to dispersion of the impact force over a large area (i.e. in the plane of the aerogel layer). In view of the high porosity of the aerogel layer and the exceptionally high strength of the aerogel layer (particularly the strength-to-weight ratio), the aerogel layer offers significant resistance to an impact and to penetration, while also providing impact or shock absorbing properties such that the impact is lessened and not simply transmitted through the laminate structure. Thus, the aerogel layer offers greater force dispersion over a greater area and thus dissipates the force more effectively.

Another advantage of this structure compared to prior art composite structures is the ability for the structure to function even after being submerged in water. Prior art composite structures containing Kevlar, for example, have been found to have reduced performance after coming into contact with water. However, it has been found that the composites according to the present invention retain or improve their performance after having been submerged with water. It is thought that this is as a result of the low water retention by aerogels, which forces water between the layers, and the mechanism by which the composite structures according to the present invention defeat a projectile. It is thought that the water must be spatially positioning between the layers of the structure and must be assisting in the transference of energy across the composite structure as well as releasing some energy as the water is forced out of the composite structure on impact.

As set out herein, a part of the ballistic layer (i.e. a different part to the part that is constrained) is able to move relative to the other layers in the stack/protective structure (i.e. moveable prior to and during impact), despite the connection connecting the adjacent layers. This movement allows the material to flex and assists in defeating a projectile or incoming force. In the prior art structures, the ballistic layers are either completely loose relative to one another (e.g. held together in a bag, but with the entire layer being restrained equally across the entire layer) or have been bonded together so that there was no movement between ballistic layers. This makes the material significantly more rigid and the dispersion forces discussed above are not present. The relative movement of the layers can be movement in any direction, for example perpendicular to the plane of the or in the plane of the layer. Movement does not require that the ballistic layers can physically separate, but can include sliding of the ballistic layers relative to one another. Thus, relative movement can include the parts sliding relative to each other due to contraction or expansion in particular regions. Movement is relative to adjacent layers, which can include layers in the stack that are not immediately adjacent (e.g. there can be an intermediate layer, including an intermediate ballistic layer). However, in embodiments, this is movement relative to the layer immediately adjacent (e.g. abutting or without any intervening layers) and, optionally, relative to all ballistic layers in the stack. In some embodiments, the layers remain in contact, but expand and contract and thus slide relative to each other in the unconstrained regions. For example, impact may cause the entire protective structure to deform or bow, and movement between the layers allows the shockwave to pass through the structure in this way. In some embodiments, relative movement may be completely prevented in the part where the connection or securing means is provided. There may also be multiple parts which are unrestrained (or restrained to a lesser degree) and/or multiple parts which are connected and thus have reduced degrees of movement compared to another part. Movement in the less restrained movement could allow displacement (in straight line distance of one point on the layer) prior to impact of a factor of at least 1.25 times more displacement from an adjacent layer, for example at least 1.5, at least 2 or at least 5.

Connecting the ballistic layers may be a direct connection between the two (or more) layers, such as by means of a connecting element or means which extends between the two layers, or the connection may be an indirect connection, such as an element which does not contact either layer but forces them into contact with one another, to a greater extent than in the unconstrained region. For example, a preferred direct connection is an integral element which extends between the layers, or even the entire protective structure or entire composite structure, to secure the layers together. An indirect connection can include, for example, a restraining element or clamping element which clamps the layers of the protective structure together. The clamping element would thus hold the protective layers in contact with one another and to prevent the protective layers from moving apart during an impact. Connection can prevent or reduce movement in one direction (e.g. apart from one another, or laterally in the plane (or a plane parallel to) the layer) or in all directions, relative to the other part. Movements can be measured as the degree it can deviate from a point on an adjacent layer (or in space). Thus, the connection can be adapted to hold the adjacent (e.g. immediately adjacent) layers in contact with one another, or at a continuous distance apart from one another, and/or to prevent sliding relative to one another, and/or to prevent or limit twisting relative to one another. In an embodiment, all of the ballistic layers are connected (e.g. constrained) in the same part. For example, the connection may be provided so that the layers are all constrained in parts located along the same plane or planes (e.g. a plane or planes perpendicular to the plane in which the layers extend). It will be appreciated that the part of the ballistic layer that is moveable relative to at least one adjacent ballistic layer may still be connected to an adjacent layer, but the connection will not restrain movement to the same degree as the connection of the other (constrained) part of the layer. In some embodiments, the part of the layer that is moveable is unconstrained, other than by virtue of its inherent connection to the connected part of the layer. In an embodiment, a plurality of (restrained) parts of each ballistic layer are each connected to at least one adjacent ballistic layer (this may be different layers) so as to restrict relative movement of each of the plurality of (restrained) parts.

The first part (the part that is moveable, or moveable to a greater extend) and the second part (the part for which movement is restricted) are separate, but inevitably these may merge such that there is no definitive boundary. The first and second parts may be of similar sizes, or may be distinct. For example, the second part may be define at least 5% of the total surface area of the layer, at least 10%, at least 20% or at least 40%.

As mentioned above, the ancillary structure provides an important function in dissipating the force of an impact or vibration. The ancillary structure can be immediately adjacent or abutting the protective structure, or there may be intermediate layers, provided that the ancillary structure can assist in reducing the force. The ancillary structure includes a layer comprising an aerogel. Aerogels are a class of highly porous (typically nano-porous) solid materials with a very low density. More particularly, an aerogel is an open-celled structure with a porosity of at least 50% (but preferably with a porosity of at least 95% air (e.g. 95 to 99.99%), optionally at least 99%) produced by forming a gel in solution and subsequently removing the liquid component of the gel using supercritical heating. As a result of the drying conditions, the solid portion of the gel maintains its structure as the liquid component is removed, thereby creating the porous body. The pores of an aerogel will typically have a pore size in the range of 0.1 to 100 nm, typically less than 20 nm. In embodiments, however, the aerogel can have a pore size in the range of 0.1 to 1000 nm, optionally 0.1 to 900 nm; 10 to 900 nm; 20 to 900 nm; 20 to 500 nm; or 20 to 100 nm. In embodiments, the porosity and pore size distributions of the aerogels can be measured using nitrogen absorption at 77K and applying the Brunauer, Emmit and Teller (BET) equation (see "Reporting Physisorption Data for Gas/Solid Systems" in Pure and Applied Chemistry, volume 57, page 603, (1985)). An aerogel can be formed from a number of materials, including silica, organic polymers (including polyimide, polystyrenes, polyurethanes, polyacrylates, epoxies), biologically-occurring polymers (e.g. gelatin, pectin), carbon (including carbon nanotubes), some metal oxides (e.g. iron or tin oxide), and some metals (e.g. copper or gold). In some embodiments, the aerogel is a cross-linked aerogel (e.g. the aerogel is formed from a cross-linked polymer, e.g. a cross-linked polyimide). Such aerogels are advantageously flexible and strong. Aerogels offer increased impact absorbing properties as they offer a much broader cone of force dispersion than the components of prior art composites and thus impact forces can be dispersed much more quickly and widely. This is at least in part due to the ability of these layers to spread impacts out in the plane of the layer, as well as through the height of the layer. In particular, the "nano-auxetic" structure of aerogels can provide them with shock-absorbing properties—the nanometre-sized tree-branch-like atomic structures spread the force of an impact along those branches, thereby rapidly dissipating the force of an impact.

The structure of the composite is such that it comprises a protective structure and an ancillary structure. Each of these comprises a stack which is an arrangement of a plurality of layers one on top of the other. This can be one directly one top of the other with complete overlap or with only partial overlap. A stack can be a stack of ballistic layers forming a protective structure, a stack of layer forming the ancillary layer and/or a stack comprising layers of both. Each consecutive layer may be directly or indirectly in contact with the other layers of the composite structure. The composite structure and/or each of the protective structure and ancillary structure may also comprise additional layers, for example provided on top (e.g. on the upper surface of the uppermost layer) or bottom (e.g. on the lower surface of the lowermost layer) of each structure. For example, the composite structure may further comprise additional layers provided between the layers of the protective structure (although, in embodiments, the ballistic layers are in direct contact with one another) and those of the ancillary structure—i.e. the first layer(s) and, where present, additional layers. Each layer may fully cover a surface of an adjacent layer or may only partially cover the surface of an adjacent layer. In some embodiments, a layer may extend beyond the edge of an adjacent layer. The layers may also each include further components or additives. In the composite structure, the layers may each have a thin sheet or layer structure—i.e. with two larger opposing faces connected by four smaller edges. Preferably, the layers of each stack are planar (or substantially planar) arranged as a series of parallel layers stacked one on top of the other.

By ballistic layer it is meant a layer formed of or comprising a high-tensile or bullet-resistant material. By high-tensile it is meant that the protective layer is strong under tension. For example, the layer may have a tensile strength of at least 200 MPa, at least 500 MPa, at least 1000 MPa; for example, 250 MPa to 5000 MPa; 1000 MPa to 5000 MPa. This can be measured, for example, by ASTM D7269 where the protective layer is a fibre-based layer and ASTM D3039 for polymer matrix based materials.

In an embodiment, each ballistic layer is connected to at least one adjacent ballistic layer at or adjacent an edge of each ballistic layer. In other words, the connection retains the layer along a region next to an edge or side or at the edge or side. This is such that movement of an edge of the ballistic layer, or all of the ballistic layers in the stack, can be constrained by a connecting means or component provided along an edge of the composite structure. Thus, by 'provided along the edge' it is meant that connection (e.g. via a fastening element or other connection means) can be provided adjacent and along a part of at least one edge of the composite structure (from a top-down view towards a major face). It has been found that this can dramatically improve the performance of composite and the same level of penetration-resistance (e.g. stab) and/or ballistic performance can be achieved with fewer layers. Embodiments of such a composite structure provide a protective structure that has a significantly higher damage resistance. In particular, it has been found that by constraining an edge or adjacent an edge, there can be a significant increase the damage resistance of the protective structure, even compared to other constraints at other positions on the composite structure. In embodiments, where plural parts of each ballistic layer are each connected to at least one adjacent ballistic layer (this may be different layers) so as to restrict relative movement of each of the plurality of (restrained) parts, these parts may be opposing parts adjacent edges of each layer. This can be advantageous, as it can provide a significant stopping effect, while also allowing flexibility in at least one direction (e.g. bending in a plane extending between the restrained edge portions). In embodiments, an edge may be restrained along substantially all (e.g. at least 90%, preferably at least 95%, or 99%) or all of its length.

In a preferred embodiment where the connection is provided at or adjacent the edge, the part of each ballistic layer that is moveable (or with increased movement) relative to an adjacent (or all the other layers of the protective structure) is a central part or region of each layer. In other words, the part that is moveable is further from the edges than the part that is restrained. This can be used to provide a central target area which can be positioned or arranged to receive an impact or strike. This can thus be the region in which the shockwave is generated and also provide flexibility. The connection can thus create a restrained portion of the layer which borders or even encloses this area of reduced constraint.

In a further embodiment, each ballistic layer is connected to at least one adjacent ballistic layer at or adjacent the edges of the ballistic layer so as to constrain movement of a part of each layer around the perimeter of each layer (i.e. the perimeter or edge of the layer is constrained). This means that each ballistic layer is constrained in the stack about its circumference or perimeter thereby preventing movement around the perimeter. This could be continuously around the perimeter, or semi-continuously around the perimeter (e.g. an interrupted line) around the perimeter. For example, the ballistic layer may be constrained around all of the edges of a major face. In a preferred embodiment the unrestrained part (or part with increased movability) can thus be a central region of each layer surrounded or enclosed by the perimeter. As mentioned above, this can be particularly effective, as it can create a relatively moveable centre portion which allows flexibility across much of the stack/layer, but also while providing a significant degree of protection.

In another embodiment, the plurality of ballistic layers in the protective structure are formed from a single sheet of ballistic material folded to form a plurality of layers, the folds between layers providing the connection between adjacent ballistic layers. Thus, the layers of the stack may be a continuous sheet which is folded back onto itself to form a plurality of parallel layers with an interconnection between each layer. These embodiments are a particularly effective way of providing interconnection between the layers of the stack, which can provide constraint along the entirety of at least one edge, and in many cases multiple edges for many of the layers in the stack. This is also particularly easy to manufacture relative to other constraint methods, as it does not require additional materials. In a preferred embodiment, the plurality of ballistic layers are formed from a single sheet of ballistic material that has been folded to provide at least one of the ballistic layers with folds along at least two edges or at least 30% of the perimeter of the layer, preferably at least 40%, at least 50%, at least 70%. In a preferred embodiment, this is the case for at least half of the ballistic layers.

In a further embodiment, the protective structure further comprises a connecting or fastening component adapted to connect each ballistic layer to at least one adjacent ballistic layer so as to restrict relative movement of a part of the adjacent ballistic layers. This can, for example, be in addition to or alternatively to folding a ballistic sheet. Thus, a fastening element or component (or "fastening means") is provided to secure the first and second layers of the composite structure together. The fastening component may be provided along an edge of the composite structure such that it constrains the edges of the composite. The fastening element may extend through all of the layers in the stack to secure the layers together and may optionally connect the protective structure with the ancillary structure (e.g. by also extending through the layers of the ancillary structure). The fastening element or component may be a mechanical coupling element or member, such as stitching, staples or a clamp. In another embodiment, the fastening element or component may be an adhesive e.g. selectively applied to only a part of each layer. In one embodiment, the fastening component connects all of the plurality of layers within the stack.

In another embodiment, all of the plurality of ballistic layers are connected to one another so as to restrict relative movement of a part of all of the ballistic layers in the stack.

In other words, each of the layers within the stack are interconnected (e.g. by one connection means or by plural separate connection means) so as to restrain parts of all of the layers in the stack. In a preferred embodiment, each of the layers in the stack are restrained in the same part of the layer. In other words, the layers can be stacked on top of each other, with the connection being provided in the same region between each of the layers. Even more preferably, this is a connection adjacent at least one edge or all of the edges.

In an embodiment, the ballistic layer (or high-tensile layer) comprises a ballistic material (or high-tensile material) comprising a high-tensile polymer and/or carbon fibre containing material. The ballistic material can be selected from the group consisting of aramid (aromatic polyamide) fibres, aromatic polyamide fibres, boron fibres, ultra-high molecular weight polyethylene (e.g. fibre or sheets), poly (p-phenylene-2,6-benzobisoxazole) (PBO), poly{2,6-diimidazo[4,5-b:4',5'-e]-pyridinylene-1,4(2,5-dihydroxy)phenylene} (PIPD) or combinations thereof. For example, in one embodiment, the screen is a UHMWPE textile with a weight of between 100 and 100 gsm, optionally between 100 and 800 gsm, 100 and 200 gsm or 140 and 180 gsm. Where fibres are used, the layer can comprise a binder, such as an epoxy resin. In an embodiment, the protective layer has a thickness of 50 μm to 500 μm, optionally 125 μm to 250 μm. In embodiments where there are a plurality of protective layers, each protective layer has a thickness of 50 μm to 500 μm, optionally 125 μm to 250 μm. Each ballistic layer can thus be formed from a sheet of ballistic material comprising the abovementioned materials. In a preferred embodiment, the ballistic layer is a sheet of UHMWPE fibres, preferably unidirectional UHMWPE wherein at least 80% (preferably 90%) of the fibres extend in a single direction.

In an embodiment, the ancillary structure comprises at least one second layer comprising graphene. In some embodiments, the ancillary structure comprises plural second layers, each of which comprises graphene (such that the layers are doped with graphene). The layer comprising graphene can be a planar layer of graphene and/or comprise graphene in the form of graphene platelets. In a preferred embodiment, the layer comprises graphene nano-platelets (GNP) or powder. The graphene platelets may be in the form of pure graphene platelets or as graphene platelets in a matrix. Graphene is an allotrope of carbon, in its fundamental form, consisting of a two-dimensional single layer of carbon atoms arranged in a single planar sheet of sp2-hybridized carbon atoms (GNPs consist of a few layer graphene materials). Graphene is known for its exceptionally high intrinsic strength, arising from this two-dimensional (2D) hexagonal lattice of covalently-bonded carbon atoms.

Embodiments can provide a composite with very advantageous properties including a combination of strength, low weight and resilience. In the context of armour, this has the benefits of providing a lightweight protection (relative to the protection offered by prior art materials). The shield can be easy to transport and assemble, which remaining strong and effective at protecting a user or object. Embodiments of the composite structure achieve this by absorbing the impact and providing a protective structure that resists penetration through the particular combination of layers and the use of an aerogel layer, as explained in more detail below. For example, the combination of the aerogel layer and the graphene layer is advantageous, as the graphene layer provides a high-tensile layer (i.e. the tensile strength of the second layer (graphene-based) is stronger than that of the second layer (aerogel-based)) which serves as a barrier to penetration and at least partly reduces the force while the aerogel can absorb a substantial portion of the impact. The graphene layer also reduces the tendency for a projectile or impact to penetrate through the aerogel without dispersing sufficient force. Together, these enable the composite structure to disperse force to a greater extent than using these layers on their own. This also means that the composite can withstand a greater degree of wear and tear than these materials can individually.

In some cases, the graphene may be functionalised to improve compatibility with a solvent in the manufacturing process, for example by functionalising using plasma treatment. For example, in some embodiments graphene may be functionalised using carboxyl groups. One example is a plasma treatment of "oxygen" functionalisation using the Haydale HDLPAS process, which is set out in WO 2010/142953 A1. The graphene platelets can have an average particle size (i.e. a $d_{50}$ number from particle size distribution relating to an average particle size) in the lateral dimension (i.e. at the greatest width across the face of the platelet) of at least 1 μm, optionally at least 2 μm, at least 5 μm, at least 15 μm, at least 25 μm (e.g. 1 to 10 μm, 1 to 5 μm, 1 to 25 μm or 1 to 40 μm). Number average thickness of the platelets can be less than 350 nm, e.g. 250 nm or less (e.g. this can be 200-600 stacked graphene layers of 0.35 nm thickness each), 200 nm or less, 100 nm or less, or 50 nm or less. These measurements can all be measured by SEM. The nanoplatelets can comprise single or multiple layers of graphene.

In some embodiments of any of the above aspects, graphene is provided the at least one layer or, where there are a plurality of second layers comprising graphene, in each of the second layers (independently or all of the layers) in an amount of at least 0.1 wt %, at least 1 wt %, at least 2 wt %, at least 5 wt %, at least 10 wt %, at least 50 wt %, at least 80 wt % or at least 95 wt %. For example, the graphene content may be between 0.1 wt % and 99 wt %, 1 wt % and 80 wt %, 2 wt % and 50 wt %.

In some embodiments, the ancillary structure comprises a polymer layer (i.e. a layer comprising a polymer). In some embodiments, there may be a plurality of different polymers and/or the polymer may be a copolymer. The layer is preferably a flexible layer (e.g. containing a flexible polymer or elastomer). The polymer layer acts as a binding layer adapted to hold together the structure of the adjacent aerogel layer (i.e. the aerogel layer in the same backing structure) when the aerogel layer receives an impact, or at least to reduce the amount of fracture occurring in the aerogel layer. The polymer layer may, therefore, may be adjacent to the (or each) aerogel layer or even abut or enclose the (or each) aerogel layer. The polymer may be a single polymer or may be a polymer blend. The polymer can have a number average molecular weight of at least 1,000 Da; for example, at least 10,000 Da (e.g. 10,000 Da to 100,000 Da). In an embodiment, the polymer layer comprises polyurethane, polyethylene (including ultra-high molecular weight polyethylene), polypropylene, polyester, polyamide, polyimide and/or an epoxy resin. In some embodiments, the polymer layer comprises polyurethane and/or an epoxy resin. In other words, the polymer layer can be a polyurethane layer or formed from an epoxy resin (e.g. a thermosetting network polymer formed from an epoxy resin with a hardener) or, in some embodiments, comprise both an epoxy resin and a polyurethane. Polyurethanes are particularly advantageous as the structure comprises rigid sections (based around the isocyanate groups) and soft flexible regions (around the diol groups), which make it suited to providing impact protection while remaining flexible. Other components can also be present. Use of a cross-linked polymer is particularly advantageous as this encourages dissipation of a force across the entire polymer layer.

In combination with a polymer layer, the aerogel layer becomes more effective in preventing damage caused by an impact or penetration. The polymer layer provides a number of functions which lead to an overall improvement in the damage resistance properties of the structure, including helping to maintaining the structure of aerogel during an impact event (e.g. preventing or reducing the risk of cracking and holding any fragments of aerogel together). For example, the polymer layer can hold the aerogel layer together as it is deformed and collapsed under the force of the impact. This allows the aerogel layer to continue to resist a force against it or resist subsequent forces (e.g. a multi-hit impact event) and retain its high tensile properties to a greater degree. As a result of its location, the polymer layer advantageously holds together the forward face of the aerogel layer (i.e. the face directed towards the impact), which is subject to the greatest force and is at risk of disintegration or separation. The polymer layer itself may also provide some impact resistance.

The graphene (e.g. in platelet form) may be provided in a matrix, such as a polymer matrix. Thus, in some embodiments, a polymer and graphene may be combined into a single layer (e.g. the second layer further comprises a polymer). Embodiments can be advantageous as these provide a matrix for the graphene, which can aid manufacture and other properties, such as resilience of the graphene layer. Moreover, when added to many polymers, graphene can significantly increase the tensile strength of that polymer. One practical weakness of graphene is the difficulties in manufacturing layers of significant size and thickness, especially since that for many implementations numerous (sometimes millions) of layers of graphene may be required to provide a material with useful characteristics. In the embodiments disclosed herein, this can be addressed by functionalising graphene and dispersing it in a polymer layer, thereby enabling the production of larger sheets. Methods of incorporating the graphene into a polymer or other matrix can include the use of mill rolling, such as dispersion using a three-roll mill. This can allow for dispersion of the graphene without the need for solvents and in a relatively high-throughput manner.

Embodiments comprising graphene and a flexible polymer layer in a layer adjacent (e.g. abutting or in contact) an aerogel layers are particularly effective at reducing damage. Flexing of the polymer within the composite structure is thought to contribute heavily to this. In the case of graphene platelets and a polymer which is cured with the platelets provided therein achieve this as, as relaxation during curing may cause folding (crinkling) of the graphene at an atomic level, energy is then dissipated from the strike in stretching back to a flat plate shape.

In some preferred embodiments, the ancillary structure comprises a layer (e.g. the second layer) comprising polyurethane doped with between 0.1 wt % and 10 wt % graphene (e.g. 0.5 wt % and 10 wt %), preferably in the form of graphene platelets. It has been found that this combination can lead to an increased tensile strength compared to polyurethane alone in excess of 20%. The graphene platelets can have an average particle size (i.e. a number average particle size) in the lateral dimension (i.e. at the greatest width across the face of the platelet) of at least 1 µm, optionally at least 2 µm, at least 5 µm (e.g. 1 to 30 µm, or 1 to 20 µm). Number average thickness of the platelets can be less than 200 nm, e.g. less than 100 nm, less than 50 nm. These measurements can all be measured by SEM. The platelets can comprise single or multiple layers of graphene.

In an embodiment, the at least one second layer consists essentially of graphene. In a further embodiment, there may be a plurality of second layers comprising graphene, and in some embodiments, each (all) of the second layers consist essentially of graphene. The term "consists essentially of . . . " means that the second layer is almost entirely formed from graphene, but may contain minor quantities of other materials (for example, as a result of contamination or as a result of the method of forming the graphene layer). For example, it may be formed from 95% or greater graphene (by weight or by volume), preferably 98% or greater, more preferably 99% or greater or even more preferably 99.9% or greater graphene. In some embodiments, the at least one second layer comprising graphene is a planar layer of graphene extending in a plane parallel to a plane defined by an adjacent aerogel layer and the protective structure (e.g. a ballistic layer of the protective structure). This is advantageous as the alignment of the graphene layer on the aerogel means that an impact coming in a direction perpendicular to the plane of the graphene will have to overcome the graphene in its strongest direction, and subsequently will impact the aerogel in a direction in which it can readily dissipate the force in the plane of the layer.

In some embodiments, the at least one second layer comprising graphene or, where there are a plurality of second layers comprising graphene, each of the second layers (independently or all of the layers), has a thickness of from 0.34 nm to 20 µm. This can include a thickness of from 1 nm to 10 µm, 10 nm to 5 µm, 10 nm to 1 µm or 20 nm to 100 nm. In some embodiments, the second layers all have substantially the same thickness.

In an embodiment, the composite material is flexible, and optionally resilient. By flexible, it is meant that the composite material can deform under the application of a force (e.g. a force to one end while the opposing end of the composite material is restrained) without damaging the structure of the composite material (e.g. without tearing or breaking). For example, it can deform without breaking using a three-point bend test. By resilient, it is meant that the composite material will return to its original shape after deformation. This could, for example, be measured by a three point bend test or a four point bend test (e.g. as set out in ASTM-C1341 or ASTM-D7264).

In an embodiment, the first layer, or where plural first layers each second layer independently, has a thickness of 20 µm to 1000 µm. For example, this can include a thickness of from 50 µm to 800 µm, 100 µm to 500 µm or 125 µm to 250 µm. In some embodiments where plural first layers, the first layers all have substantially the same thickness.

In an embodiment, each first layer of the ancillary structure is bonded to an adjacent second layer of the ancillary structure. In other words, each graphene and/or polymer layer is bonded to an adjacent aerogel layer. This can be directly (i.e. with direct contact between the first layer and the aerogel layer and bonded provided by the adhesive nature of either of the first or second layer) or indirectly (with another component, for example an adhesive or another layer, provided between the graphene layer and the adjacent aerogel layer). This is advantageous as this has been found to improve ballistic performance of the composite.

In an embodiment, the composite structure comprises between 2 and 250 first layers (i.e. layers comprising aerogel) and may optionally comprise between 2 and 250 second layers (i.e. layers comprising graphene and/or a polymer). In an embodiment, the composite comprises at least 5 layers, at least 10 layers or, in some embodiments, at least 25 layers. For example, there may be 10 to 200 layers, 25 to 150 layers, 50 to 125 layers. The number of first layers may be the same as the number of second layers. In some embodiments, the number of first layers is at least 5, at least 10 or, in some embodiments, at least 25. For example, there may be 10 to 100 layers or 25 to 50 first layers. It has been found that an increased number of layers can lead to a projectile being stopped earlier in the composite than in cases where there are fewer layers. This may be as a result of a shear thickening effect.

In a second aspect of the invention there is provided a ballistic article comprising the composite structure of the embodiments disclosed herein. In an embodiment, the article is a wearable article. In a third aspect of the invention, there is provided a use of a laminate structure according to any of the embodiments disclosed herein to absorb the force of an impact and/or prevent penetration through an article.

BRIEF DESCRIPTION OF THE DRAWINGS

Specific embodiments of the invention will now be discussed in detail with reference to the accompanying drawings, in which.

Like components are given like reference numerals. For example, a composite structure is referred to as 101, 201, . . . 501 and the like.

DETAILED DESCRIPTION OF THE INVENTION

Figure 1:
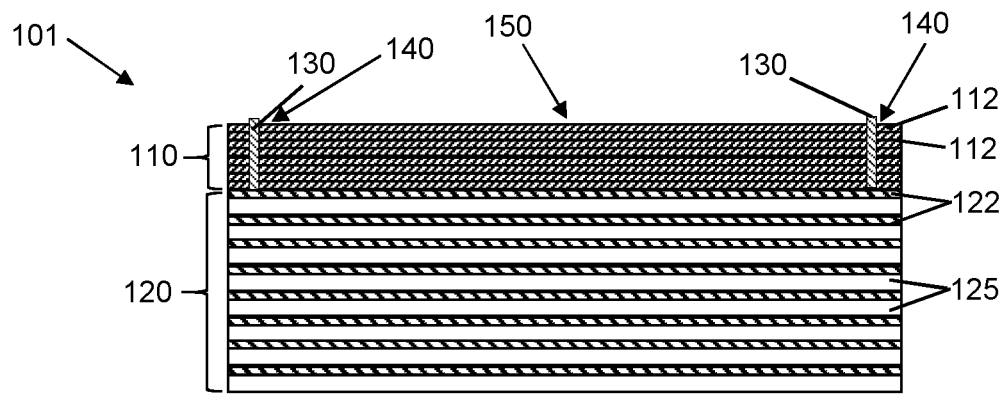
FIG. 1 shows a cross-sectional side view of a first embodiment of a composite structure according to the invention.
Figure 2A:
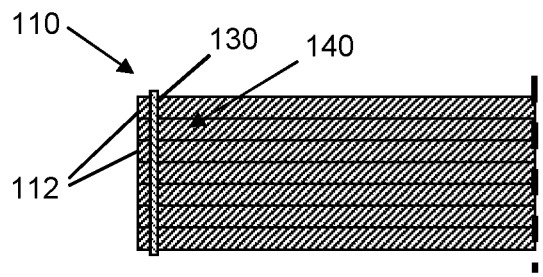
FIG. 2a shows a close up cross-sectional side view of a part of the first embodiment and FIG. 2b shows a top view of the first embodiment.
Figure 2B:
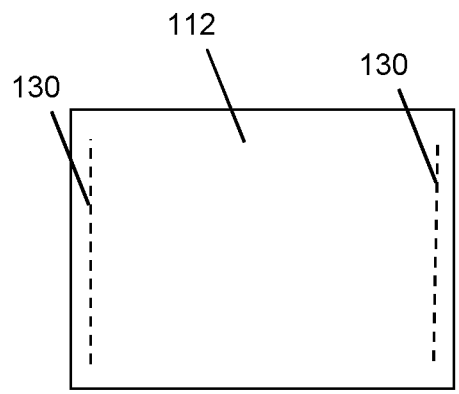

A first embodiment of the invention is shown in FIGS. 1 to 3, in which there is a composite structure 101 comprising an upper protective structure 110 and a lower ancillary structure 120 provided beneath and abutting the underside of the protective structure 110.

The protective structure 110 is comprised of a plurality of ballistic layers 112 arranged one on top of the other to form a stack. The protective structure 110 also comprises two connecting elements 130 which extend along opposing edges of the stack of ballistic layers 112 of the protective structure 110 (see the plan view of FIG. 2b) to secure the ballistic layers 112 together and to restrict relative movement of the ballistic layers 112 forming the protective structure, as will be described in more detail, below.

The connecting elements 130 in this embodiment each comprise a thread of high-tensile material 130 which stitches the layers 112 together. In particular, each thread extends through the depth of the protective structure 110 (see the cross section through connecting element 130 shown in FIGS. 1 and 2a as it extends through the thickness of the stack of ballistic layers), passing along the bottom surface of the lowermost layer 112 and then extending back through the layers 112 until it reaches the uppermost layer 112 on the top surface of the composite structure 101. This pattern repeats to provide a stitching along an edge, as can be seen most clearly from the plan view provided in FIG. 2b. Thus, the composite structure 101 is configured so that each of the ballistic layers 112 is connected to its adjacent layer(s) by virtue of connecting elements 130, which extend through the entire depth of the protective structure 110. At each end, the connecting element 130 is secured to the upper surface, for example using an adhesive, and it is pulled tightly so as to hold the protective layers 112 in contact with one another and to prevent the protective layers 112 from moving apart during an impact. The connecting element 130 thus secures the protective layers 112 together to restrict relative movement in the region 140 of the connecting element 130.

Figure 3A:
FIGS. 3a and 3b show a close up cross-sectional side view of a part of the first embodiment of a composite structure according to the invention.
Figure 3B:
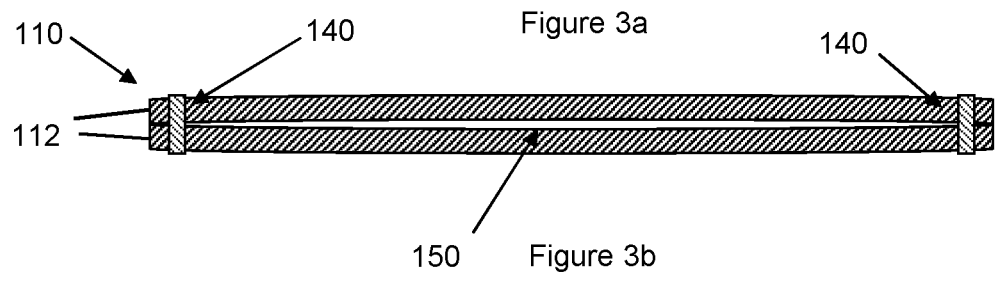

Although movement of the ballistic layers 112 in the region 140 is constrained in the regions surrounding and incorporating the connecting elements 130, no interconnect between the ballistic layers 112 is provided between the central regions 150 of each ballistic layer 112 and the ballistic layers 112 are sufficiently flexible to allow relative movement of the ballistic layers 112 in this central region 150. This allows movement of these parts of the ballistic layers 112 during an impact event, such as when the composite structure 101 is struck by a projectile. The structure of the protective layer is therefore one in which the connecting elements 130 define two constrained regions 140 in which movement is restricted and which enclose an unconstrained region 150 in the centre of each ballistic layer 112. An example is shown in the comparison of FIGS. 3a and 3b, which shows movement which may occur between two ballistic layers 112 when vibration occurs.

As discussed above, and as will be explained in more detail below, by providing the constraint while also providing a part which can be moved relative to one another, this allows the protective structure to provide a significant stopping power. Moreover, by providing the connecting elements 130 on opposing edges of the stack of ballistic layers 112, not only is relative movement prevent in particular regions 140 of the protective structure 110, but lateral movement of the layers 112 is prevented so that the structure remains The ancillary structure 120 in this embodiment comprises alternating second 122 and first layers 125. The layers 122, 125 in this ancillary structure are both flexible and impact absorbing (i.e. they dissipate energy). The ancillary structure 120 is provided behind the protective structure 110 and is abutting the protective structure 110 such that a force acting on the protective structure 110 can be partly absorbed by the ancillary structure 120.

In use, the composite structure 101 can be used in an article, such as body armour, to prevent impact or penetration. The structure 101 can be arranged in an article with the top surface of the protective structure 110 forming the outermost layer (i.e. towards the direction from which the force is expected). In the case of body armour, the composite structure 110 would be arranged with the protective structure 110 directed away from the body and with the ancillary structure 120 being the layer closest to the body of the wearer. In the case of an impact, such as a projectile impact (e.g. a bullet hitting the body armour), the protective structure 110 is the first part of the composite that the projectile comes into contact with. For example, the composite structure 101 can be used to protect a person or object by absorbing an impact (e.g. from a projectile, weapon or collision) and/or preventing penetration through the structure. The composite structure 101 in embodiments can form part of a ballistic resistant article, such as a worn article (e.g. projectile resistant body armour) or as a protective layer on a vehicle or building, or can form part of a penetration resistance article, for example as stab-resistance body armour.

In a specific embodiment, the ballistic layers 112 of the protective structure 110 are each a layer of unidirectional UHMWPE (with resin to bond the fibres) having a thickness of 180 micrometres. These are bound with a connecting element 130 in the form of a thread of woven UHMWPE fibres. In this embodiment, the second layers 122 of the ancillary structure 120 are polymer (polyurethane) layers doped with graphene nanoparticles and with a thickness of 20 micrometres. The first layer 125 of the ancillary structure 120 is a 125 micrometre thick layer of polyimide aerogel.

The use of an aerogel, particularly an aerogel in combination with a graphene containing layer (even more particularly where the layer is a flexible polymer (elastomer) layer doped with graphene) are particularly advantageous as the force of the impact is initially significantly reduced by the initial contact with the protective structure as a result of the particular contrained/unconstrained arrangement. The force is also significant reduced by deformation of the layers of the ancillary structure 120, starting with the uppermost layers 122, 125 of the ancillary structure 120 and followed by the remaining layers 122, 125 depending on the magnitude of the force. As the force impacts the upper layers 122, 125, the layers 122, 125 deform and the force begins to be dissipated out by these layers (which is understood to be laterally out of the layers). One of the major mechanisms for this absorption of force is the deformation of the aerogel (which is essentially compressed by the force of the impact). As the force continues, other adjacent layers in the structure will begin to deform thereby further disappoint the force. Eventually, the projectile or source of the force will be stopped thereby preventing penetration and reducing or completely avoiding the transfer of force to the object or person protected by the composite structure.

Although the layers 112, 122, 125 in this embodiment are all equal sizes and arranged directly on top of one other with all of the edges of the layers 112 in alignment, this is not a requirement and different layers, including layers of the same composition and type, may have different widths, alignments and thicknesses, for example.

Figure 4:
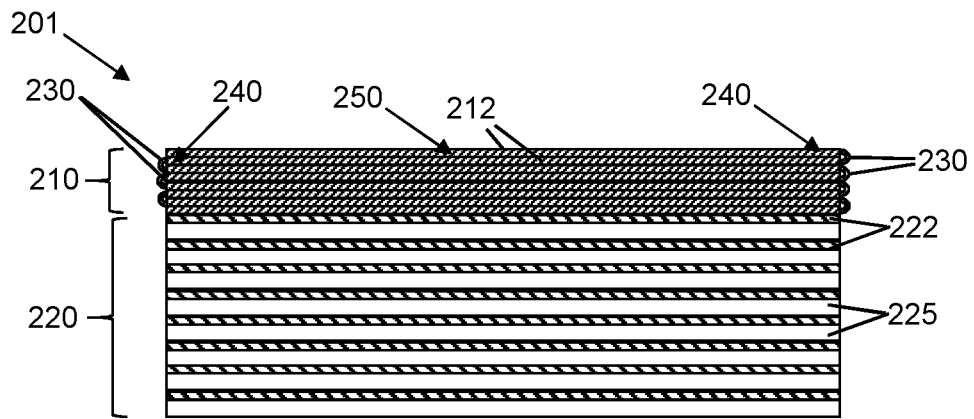
FIG. 4 shows a cross-sectional side view of another embodiment of a composite structure according to the invention.

Another embodiment of a composite structure 201 is shown in FIG. 4. This embodiment also comprises a protective structure 210 provided on top of an ancillary structure. As in the embodiment of FIGS. 1 to 3, the protective structure 210 of this embodiment comprises a plurality of stacked ballistic layers 212 provided on top of a stack of alternating second layers 222 and first layers 225 forming the ancillary structure 220.

The protective structure 210 in this embodiment differs from that of the embodiment of FIGS. 1 to 3 in that the means for providing the connection between parts of the ballistic layers 212 of the protective structure 210 is not a separate thread but is instead integral to the ballistic layers 212. In particular, in this embodiment, the ballistic layers 212 are formed from a single sheet of high-tensile material 202 (see FIG. 5) that is folded on itself to provide the array of parallel ballistic layers 212 of high-tensile material that are interconnected by folded parts 230 of the material. Thus, it is the folds 230 that form the connecting elements 230.

Figure 5:
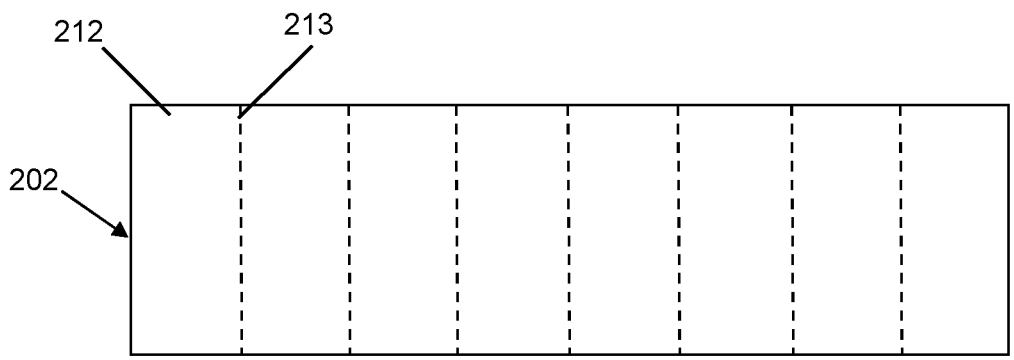
FIG. 5 shows a top view of a sheet of ballistic material.

FIG. 5 shows a single sheet of high-tensile material 202 which is folded along fold lines 213 in an alternating formation, with the folds 230 being on opposite faces of the ballistic layers 212 (as can be seen more clearly in the concertinaed shape shown in FIG. 4). This provides constraint along both opposing edges of each ballistic layer 212 and an unconstrained region 250 in the centre of each ballistic layer 212. The use of a folded ballistic material 202 for form multiple ballistic layers 212 is particularly advantageous as it provides constraint over a significant portion of the perimeter of each ballistic layer 212. Moreover, the degree of restriction of movement in the regions 240 can be controlled by the degree of the tightness of the folds 230. This design can also be significantly easier to manufacture than existing laminates, while still also allowing for flexibility.

In other embodiments, other fold configurations can be provided to increase the degree of constraint on particular layers, increase the number of ballistic layers, provide layers with different degrees of constraint and provide other modifications. For example, the ballistic material 202 shown in FIG. 5 could instead be folded along the fold lines 213 with a rolling motion. That is, starting from the left hand side in the configuration shown in FIG. 5, each portion defining a ballistic layer 212 (in the final structure) could be folded towards the right hand side by folding each portion defining a ballistic layer 212 to the right and onto the top surface (the visible surface) of the material. As a result, the left hand portion of material defining a ballistic layer 212 will be constrained in the middle of the stack.

Figure 6:
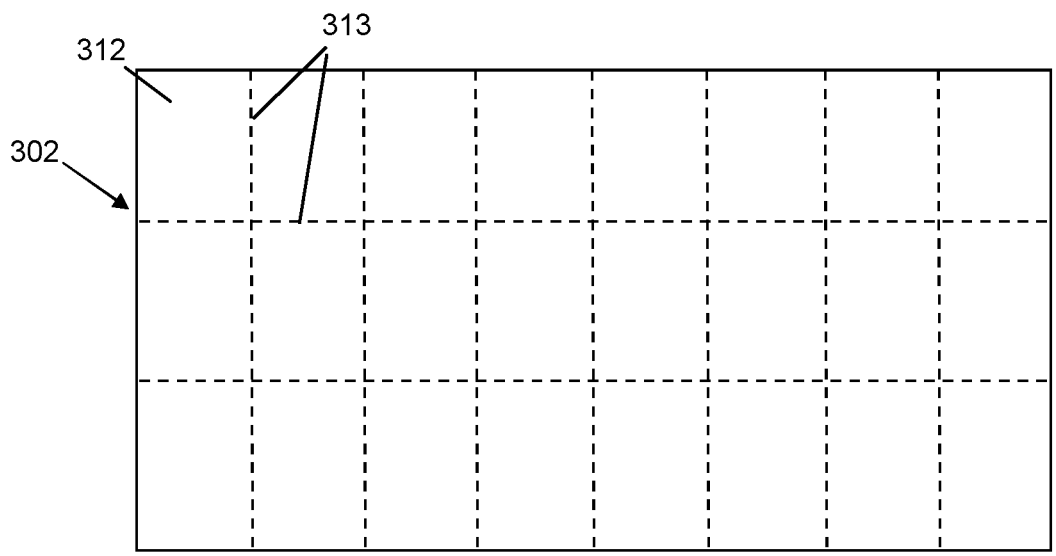
FIG. 6 shows a top view of a sheet of ballistic material.

Another sheet of ballistic material 302 is shown in FIG. 6. As with the material 202 of FIG. 5, this material 302 has fold lines 313 illustrating a preferred means of folding material to provide the connection, and thus constraint, between ballistic layers 312 in a resultant structure. In FIG. 6, fold lines 313 show how this can be divided into twenty four equal and connected portions defining the ballistic layers 312 of a structure. One example is to fold both the top third and bottom third (based on the view shown in FIG. 6) on top of the middle portion, and then fold the newly formed single row in a similar manner to FIG. 5. This results in a large number of the ballistic layers 312 being held on multiple sides. For example, in this configuration six of the regions defining ballistic layers in the centre of the sheet of material 302 have folds (and thus are held) on all edges, fourteen have folds on three edges and the remaining four have folds on two edges. This provides an easy to manufacture, but highly effective structure as a result of the significant degree of constraint around the edges of a large number of the ballistic layers 312 in the resultant structure.

In embodiments, ballistic material (such as material 202, 302) which is folded to provide plural connected ballistic layers in accordance with the invention may be retained in its folded configuration by a holding means. For example, a housing may be provided (e.g. a housing for the entire composite material or a housing for only the protective layer) or a clamping or holding element may be used. This can assist with manufacture.

In some embodiments, a composite structure may comprise a number of repeating elements, such as a plurality of protective structures and/or ancillary structures. In some embodiments, these may alternate but in others they may be provided in other patterns, such as with the protective structures in front of the ancillary structures. Preferably, at least one protective structure is provided in front of (relative to the direction of expected impact or the outermost direction) the ancillary structure or all ancillary structures where there are plural.

Figure 7:
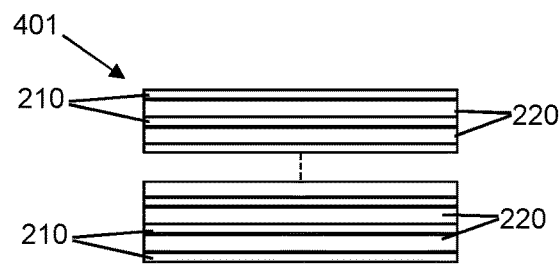
FIG. 7 shows a cross-sectional side view of another embodiment of a composite structure according to the invention.

One embodiment where there are repeating elements and both plural protective structures and plural ancillary structures is shown in FIG. 7. In this embodiment, the composite structure 401 comprises a plurality of protective structures 210 and a plurality of ancillary structures 220. The protective structures 210 and the ancillary structures 220 alternative such that the composite structure 401 has a repeating structure of protective structure 210/ancillary structure 220/protective structure 210/ancillary structure 220 (dashed lines in FIG. 7 indicate continuation of this repetition for n units, depending on the requirements of the composite). In this embodiment, the protective structures 210 and ancillary structures 220 are those of the embodiment of FIG. 4, such that essentially the stack of FIG. 4 is repeated numerous times to form a thicker composite structure 401. Since each protective structure 210 and each ancillary structure 220 comprises a plurality of layers (see FIG. 4), the composite structure 401 comprises numerous stacks of ballistic layers 212, aerogel layers 225 and graphene-containing polymer layers 222, with the ballistic layers 212 constrained at the edges to thereby provide a material that is very effective at stopping projectiles and preventing penetration through the structure 401.

Figure 8:
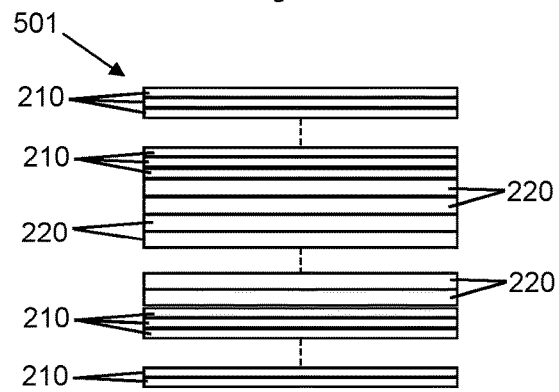
FIG. 8 shows a cross-sectional side view of another embodiment of a composite structure according to the invention.

Another embodiment in which there is a composite structure 501 comprising plural protective structures 210 and plural ancillary structures 220 is shown in FIG. 8. In this embodiment, however, the composite structure 501 has the structure of a plural protective structures 210 provided on top of one another and in direct contact, followed by plural ancillary structures 220 provided on top of one another and arranged beneath the first stack of protective structures 210, followed by another stack of protective structures 210 provided beneath the ancillary structures 220. Thus, the composite structure 501 has a repeating structure of protective structure 210/protective structure 210 . . . protective structure 210/ancillary structure 220 . . . ancillary structure 220/protective structure 210/protective structure 210 . . . protective structure 210. Dashed lines in FIG. 8 and " . . . " herein indicate continuation of these structures for n units, depending on the requirements of the composite.

These repeating structures have been found to be particularly effective at preventing penetration and absorbing impact as the presence of multiple discrete backing structures means that a failure of one aerogel layer (e.g. a fracture or breach) or protective layer will not necessarily result in failure of the structure, since there are other layers to absorb an impact. Further, a further effect has been observed whereby an increase in the number of layers leads to an increase in the effectiveness of the earlier layers in the structure, particularly where parts of the ballistic layers are constrained.

Figure 9A:
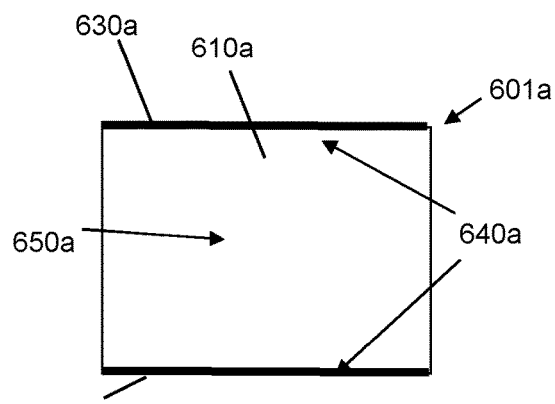
FIGS. 9a to 9b show a plan view of various embodiments of the invention.
Figure 9B:
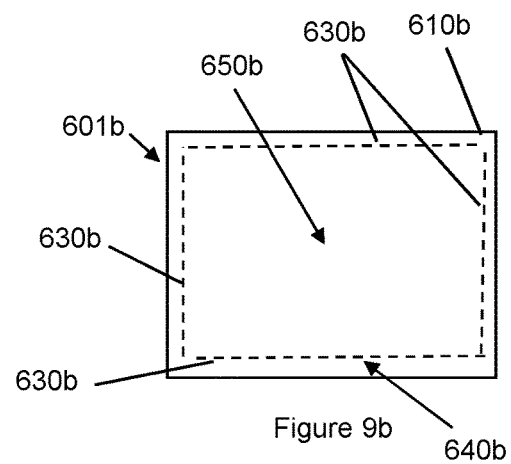
Figure 9C:
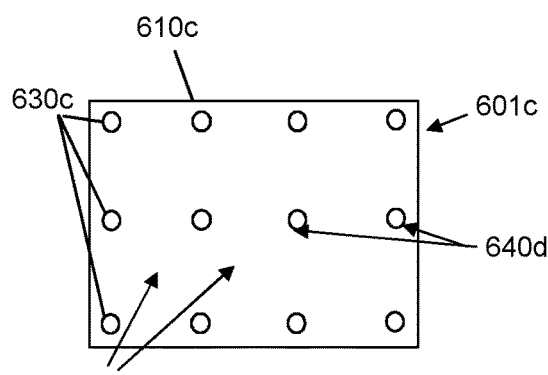
Figure 9D:
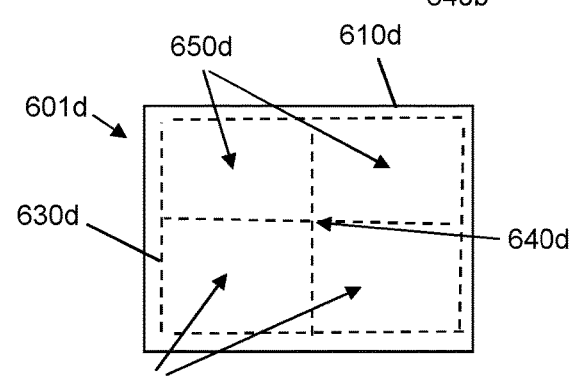

Various arrangements of the connection and constraint of ballistic layers are shown in FIGS. 9a to 9d. In these Figures, composite structures 601a-d are shown in a plan view with the top ballistic layer 610a-d of each composite structure 601a-d visible. The composite structures 601a-d each have various configurations of connecting elements 630a-d and thus regions in which a part of the top ballistic layer 610a-d is restrained (i.e. first regions 640a-d) and a region where it is able to more freely move (i.e. second region 650a-d). In FIG. 9a, the two opposing connecting elements 630a are folds in a single sheet of ballistic material that has been used to form multiple ballistic layers 610a. In FIG. 9b, stitching 630b has been provided adjacent the edges of the top ballistic layer 610b around the perimeter of the ballistic layer 610b. This creates a central region where it is less constrained 650a and an edge boundary 640b where the layer 610b is more constrained. In FIG. 9c, a series of pins 630c are provided as connecting elements and extend through all of the ballistic layers 610c of the protective structure. These have a 4×3 array and provide a number of different regions of high and low restraint. FIG. 9d shows another configuration, in which stitching 630d is used to divide the layer 610d into four primary regions in which there is less constraint (i.e. second regions 650d).

Methods of manufacturing examples of composite structures will now be described with reference to specific examples. Methods of manufacturing graphene-containing layers (e.g. graphene-containing polyurethane layers) and composite structures which include such layers, together with aerogel layers and high-tensile layers are set out in UK patent application nos. GB1802895.1, GB1802899.3, GB1808119.0 and International patent application nos. PCT/GB2018/050462 and PCT/GB2019/050147, all of which are incorporated herein by reference.

EXAMPLES

Specific examples of embodiments of composite structures are provided below.

Example 1

A composite structure having the structure set out in Table 1, below, was prepared. The composite structure, in order of layers from uppermost (Active/Strike face) to lowermost (Back face), was:

TABLE 1

| Composite structure of Example 1 |
|---|
| Stab-proof UHMWPE |
| 7 stacks x 16 layers of UHMWPE |
| 1 stack x 18 periods of |
| graphene/polyurethane layers alternating |
| with aerogel layers |
| 1 stack x 16 layers of UHMWPE |
| 1 stack x 8 periods of graphene/polyurethane |
| layers alternating with aerogel layers |
| 1 stack x 4 layers of UHMWPE |
| Stab-proof UHMWPE |

The specific structure and manufacture of each of the layers is described below.
Stab-Proof UHMWPE The stab-proof casing is a woven UHMWPE cover at a weight of 660 gsm.
Protective Structures—Stacks of UHMWPE The UHMWPE stacks used in Example 1 are made from a single DOYENTRONTEX Bulletproof unidirectional sheet; WB-674M; 160 g/m$^2$, which is folded to provide the stack of 16 ballistic layers. Thus, the 7 stacks of 16 ballistic layers were formed from 7 different sheets of UHMWPE ballistic material, each of which was folded in a 4×4 configuration. The stack of 4 ballistic layers was also prepared from a single, smaller sheet of UHMWPE ballistic material (folded in a 1×4 configuration) that was sized so that each ballistic layer had the same dimensions as the layers of the larger stacks. Each stack thus provides a protective structure comprising connecting ballistic layers. The face size (and therefore the size of each layer) was approximately 400 mm×300 mm.

Ancillary Structures—Graphene/Polyurethane Layers Alternating with Aerogel Layers The ancillary structure was comprised of 18 periods of graphene/polyurethane layers alternating with aerogel layers. Specifically, each period had a polyurethane layer that was doped with graphene and applied on top of an aerogel layer. This structure was repeated 18 times for the upper ancillary structure and 8 times for the lower structure, to therefore provide each with a repeating structure: . . . Graphene+PU/Aerogel/Graphene+PU/Aerogel . . . .

The polyurethane used was Xencast PX60 (provided as a two-part system, which is mixed together at 100:100 by weight), the Graphene was XG graphene nanoplatelets Grade M (average platelet diameter of 15 micrometres) and the Aerogel was a polyimide aerogel (AeroZero 125 micrometer film from BlueShift Inc (US)). To aid in enhancing the graphene/polyurethane interface, the graphene was functionalised with carboxyl (COOH) surface chemistry (the method used also adds some OH functionality to the surface) in a Haydale plasma reactor (using a carboxyl process).

The graphene/polyurethane layers were prepared by adding the graphene nanoplatelets to the resin component of the two-part polyurethane system in an amount of 1% by weight. This was then mixed in a centrifugal mixer (Thinky AVR-500 T) at 800 RPM for five minutes, followed by a three-roll mill for thirty minutes (5 micrometres on the front gap and 15 micrometres on the rear gap; front roll 300 rpm). The two parts of the polyurethane system were then combined and hand mixed for 5 minutes and left to allow inherent viscosity to increase. Although the time it takes the viscosity of the PX60 mixture to double (i.e. the resin component) is 11 minutes ("pot life"), the mixture was left to sit for a further ten minutes to all build-up of inherent viscosity. This stops unwanted penetration into the aerogel in a subsequent step and lowers the amount of creep following film forming.

The graphene filled polyurethane is cast onto a polypropylene sheet using a 10 micrometre K bar. This is then placed in an oven at 60° C. for 20 minutes. At this point, the aerogel (non-porous side of the aerogel) is placed onto the polyurethane and pressed down with a roller. The PP/PU+graphene/aerogel structure is returned to the oven for a further 4 hours. The aerogel/graphene+polyurethane structure is cut to size and the polypropylene layer is removed. The stack is then built up by placing the aerogel/graphene+polyurethane structures on top of one another. The graphene+polyurethane layers have a density of 1.05 g/cm$^3$ (20 g/m$^2$) and the aerogel layer has a density of 0.2 g/cm$^3$ (25 g/m$^2$).

Assembly

The ancillary structures and protective structures are then arranged in the order set out in Table 1, with the stab-proof UHMWPE provided on either side of the structure. The complete structure was then placed inside a fabric pocket to provide a composite shield. Total weight was 2.72 kg (UHMWPE 2.5 kg, Aerogel layers 108 g, PU/graphene layers 116 g).

Example 2

A composite structure having the structure set out in Table 2, below, was prepared. The composite structure, in order of layers from uppermost (Active/Strike face) to lowermost (Back face), was:

TABLE 2

| Composite structure of Example 2 |
| --- |
| Stab-proof UHMWPE |
| 3 stacks x 12 layers of UHMWPE |
| 1 stack x 12 periods of graphene/polyurethane layers alternating with aerogel layers |
| 3 stacks x 12 layers of UHMWPE |
| 1 stack x 12 periods of graphene/polyurethane layers alternating with aerogel layers |
| 3 stacks x 12 layers of UHMWPE |
| 1 stack x 12 periods of graphene/polyurethane layers alternating with aerogel layers |
| 1 stack x 12 layers of UHMWPE |
| Stab-proof UHMWPE |

The layers and structures within this composite structure were prepared in line with those of Example 1. Total weight was 2.52 kg (UHMWPE 2.3 kg, Aerogel layers 102 g, PU/graphene layers 110 g).

Example 3

A composite structure having the structure set out in Table 3, below, was prepared. The composite structure, in order of layers from uppermost (Active/Strike face) to lowermost (Back face), was:

TABLE 3

| Composite structure of Example 3 |
| --- |
| Stab-proof UHMWPE |
| 2 stacks x 15 layers of UHMWPE |
| 1 stack x 10 periods of graphene/polyurethane layers alternating with aerogel layers |
| 1 stack x 15 layers of UHMWPE |
| 1 stack x 11 periods of graphene/polyurethane layers alternating with aerogel layers |
| Stab-proof UHMWPE |

The layers and structures within this composite structure were prepared in line with those of Example 1. The composite structure of this example was considerably lighter (~1 kg) compared to the weight of that of Examples 1 and 2 due to the use of less UHMWPE.

Material Manufacture

Additional examples of how to produce the materials used in the composite structure are provided herein below.

Manufacturing Example 1—An Ancillary Structure (Graphene/Polymer Layers and Aerogel Layers)

An ancillary structure comprising of 9 repeating periods was prepared, each period comprising a layer of 125 μm flexible polyimide aerogel (AeroZero 125 micrometer film from BlueShift Inc (US)) and a graphene layer. The graphene layer was formed by an inking technique. In particular, a graphene-containing ink (LTR4905; Heraeus Noblelight Ltd) was used to form the graphene layer. The graphene-containing ink was a combination of 4-hydroxy-4-methylpentan-2-one and dipropylene glycol monomethyl ether as solvent and carrier, with 20 weight % graphene loading. The graphene in the ink is Perpetuus graphene with 15 μm lateral flake size and had been functionalised using amine species. The ink was applied to the surface of the aerogel using a 6 μm k-bar (K hand coater; Testing Machines, Inc.). It is thought that the shear rates associated with the application of the ink on the aerogel aligns the graphene flakes parallel to the aerogel surface. As the layer dries, the solvent evaporates leaving a final layer thickness of 2 to 3 μm. It is thought that the solvent evaporation leads to further alignment of the graphene platelets parallel to the aerogel surface. The ink is subsequently heat treated at 125° C. for 10 minutes to drive off remaining solvent and to harden the polymer. This left a layer of graphene platelets on the surface of the aerogel.

Manufacturing Example 2—An Ancillary Structure (Polymer Layers and Aerogel Layers)

A 125 μm flexible polyimide aerogel layer (AeroZero 125 micrometer polyimide aerogel film; BlueShift Inc (US)) was cut to size and coated with a 20 μm layer of a polyurethane (PX30; Xencast UK Flexible Series PU Resin system. Manufacturer reported properties: Hardness of 30-35 (Shore A); Tensile strength 0.7-1.2 MPa; Elongation 100-155% at break; Tear Strength 3.5-3.8 kN/m) using a slot die process. After coating, the polyurethane layer was left to cure at room temperature for 12 hours. The aerogel/polyurethane composite layer (backing structure) was then cut to size.

Manufacturing Example 3—An Ancillary Structure (Graphene/Polymer Layers and Aerogel Layers)

The ancillary structure was prepared in an identical manner to Manufacturing Example 2, with the exception that 5 wt % functionalised graphene (Elicarb graphene powder; Thomas Swan & Co Ltd UK Product No. PR0953) was dispersed in the polyurethane prior to slot die processing. Accordingly, each polyurethane layer in the backing structure comprised 5 wt % graphene.

More specifically: prior to dispersion, the graphene was treated with a plasma treatment of "oxygen" functionalisation using the Hydale HDLPAS process, which is set out in WO 2010/142953 A1 (alternatively, plasma functionalised graphene nanoplatelets are commercially available from Hydale "HDPLAS GNP" e.g. HDPlas GNP-$O_2$ or HDPLAS GNP-COOH) Following treatment, the graphene and polyurethane are premixed in a planetary centrifugal mixer and the resin was degassed under vacuum to remove air bubbles. The mixture was then passed through a dispersion stage using a Three Roll mill (at 40° C. with a <5 μm gap) and with eight passes. The graphene/polyurethane mixture was then mixed with a hardener, followed by subsequent degassing using a planetary centrifugal mixer.

Once the graphene/polyurethane mixture was created it was layered down onto a polypropylene sheet with a 20 μm drawdown wire rod (which regulates the thickness to 20 μm). After the layering down has been completed, the layer was left to dry out. However, before the graphene/polyurethane layer fully cures, the aerogel is stuck onto the layer. The combined layers making up the backing structure were then left to cure for 24 hours, and after which the combined layer of aerogel and the polyurethane/graphene resin mixture was cut into shape.

Comparative Example 1

To test how effective the ancillary structure is, the ancillary structures were removed from the composite structure of Example 1. In particular, the stacks containing the graphene/polyurethane layers alternating with aerogel layers were removed. To keep the areal density approximately the same, the ancillary structures were replaced with 2 additional 16 sheet UHMWPE panels.

Testing

Testing of the composite materials of Examples 1 to 3 was carried out. This was carried out in accordance with National Institute of Justice (NIJ) 0101.06 standard for Ballistic Resistance of Body Armour. Within this standard, there are five types of classification, as set out in Table 4, below:

TABLE 4

| NIJ 0101.06 standards classifications | |
|---|---|
| Classification | Ammunition Required |
| IIa | 9 mm Full Metal Jacketed Round Nose (FMJ RN) bullets with a specified mass of 8.0 g (124 gr) and a velocity of 373 m/s ± 9.1 m/s (1225 ft/s ± 30 ft/s) and with .40 S&W Full Metal Jacketed (FMJ) bullets with a specified mass of 11.7 g (180 gr) and a velocity of 352 m/s ± 9.1 m/s (1155 ft/s ± 30 ft/s). |
| II | 9 mm FMJ RN bullets with a specified mass of 8.0 g (124 gr) and a velocity of 398 m/s ± 9.1 m/s (1305 ft/s ± 30 ft/s) and with .357 Magnum Jacketed Soft Point (JSP) bullets with a specified mass of 10.2 g (158 gr) and a velocity of 436 m/s ± 9.1 m/s (1430 ft/s ± 30 ft/s). |
| IIIA | .357 SIG FMJ Flat Nose (FN) bullets with a specified mass of 8.1 g (125 gr) and a velocity of 448 m/s ± 9.1 m/s (1470 ft/s ± 30 ft/s) and with .44 Magnum Semi Jacketed Hollow Point (SJHP) bullets with a specified mass of 15.6 g (240 gr) and a velocity of 436 m/s ± 9.1 m/s (1430 ft/s ± 30 ft/s). |
| III (rifles) | Type III (flexible armour) 7.62 mm FMJ, steel jacketed bullets (U.S. Military designation M80) with a specified mass of 9.6 g (147 gr) and a velocity of 847 m/s ± 9.1 m/s (2780 ft/s ± 30 ft/s). |
| IV (Armour piercing rifles) | Type IV (flexible armour) .30 caliber AP bullets (U.S. Military designation M2 AP) with a specified mass of 10.8 g (166 gr) and a velocity of 876 m/s ± 9.1 m/s (2680 ft/s ± 30 ft/s). |

In Table 4, the following nomenclature is used:
Jacketed Hollow Point Bullet (JHP): A bullet consisting of a lead core that has a hollow cavity or hole located in the nose of the bullet and is completely covered, except for the hollow point, with a copper alloy (approximately 90% copper and 10% zinc) jacket. Jacketed Soft Point Bullet (JSP): A lead bullet that is completely covered, except for the nose, with a copper alloy (approximately 90% copper and 10% zinc) jacket. Also known as a Semi Jacketed Soft Point (SJSP).

Full Metal Jacketed Bullet (FMJ): A bullet consisting of a lead core completely covered, except for the base, with copper alloy (approximately 90% copper and 10% zinc). "Total Metal Jacket (TMJ)," "Totally Enclosed Metal Case (TEMC)," and other commercial terminology for bullets with electro-deposited copper and copper alloy coatings are considered comparable to FMJ bullets for this standard.

Semi Jacketed Hollow Point Bullet (SJHP): A bullet consisting of a lead core with a copper alloy (approximately 90% copper and 10% zinc) jacket covering the base and bore riding surface (major diameter), which leaves some portion of the lead core exposed, thus forming a lead nose or tip, which has a hollow cavity or hole located in the nose or tip of the bullet.

Semi Jacketed Soft Point Bullet (SJSP): A bullet, also known as a Jacketed Soft Point (JSP), consisting of a lead core with a copper alloy (approximately 90% copper and 10% zinc) jacket covering the base and bore riding surface (major diameter), which leaves some portion of the lead core exposed, thus forming a lead nose or tip.

Examples 1 and 2

Example 1 was tested at level III (above) using 7.62 Full Metal Jacket (M80 US Military designation) with a specified mass of 9.6 g (147 gr) and a velocity of 847 m/s±9.1 m/s (2780 ft/s±30 ft/s). Two M80 shots were fired against Example 1 as per the NIJ 0101.06 Level 3 standard. The composite structure of Example 1 was placed against a backing block of ballistic clay, Roma Plastilina #1 modeling clay, (ASTM Specification E3004) which had been preconditioned for 24 hours in accordance with the standard. The composite structure of Example 1 was strapped to the clay backing.

In both cases, the composite of Example 1 prevented penetration of the bullets through the structure. Back-face deformation was sufficiently small that the composite would meet the Level III criteria.

A test was also carried out for the composite structure of Example 2. In this case, a single M80 shot was carried out and the structure prevented penetration of the bullet through the structure and had acceptable back-face deformation. In this example, the back-face deformation was reduced compared to that of Example 1 indicating that the redistribution of the graphene loaded PU coating has helped dissipate more of the energy.

Figure 10:
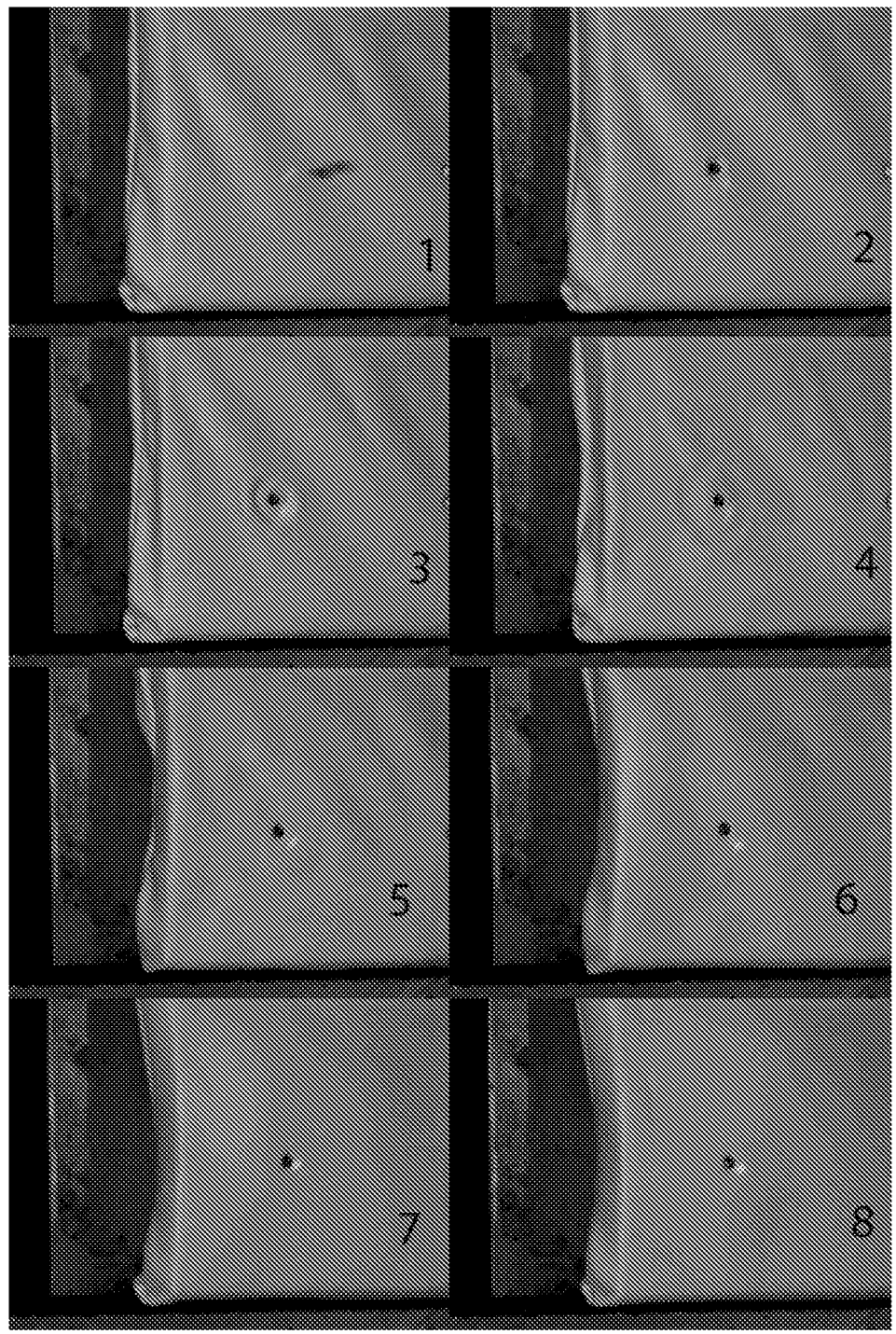
FIG. 10 shows images of a ballistic test of a composite structure according to the invention.

FIG. 10 shows a sequence of still images taken from a video sequence taken of the M80 shot on Example 2. The M80 bullet can be seen approaching in still 1 at 2800 ft·s$^{-1}$. The initial penetration of the composite material can be seen in still 2, with stills 3, 4 and 5 showing the shock wave passing across the surface of the structure. The shock wave is then disrupted by internal reflections within the shield, which serves to be a significant effect in reducing the force (i.e. force dissipation). Interference from reflected wave fronts stops the wave being easily seen in the rest of the still images.

Comparative Example 1

Comparative Example 1 was tested in the same way as Example 1. Two 7.62 Full Metal Jacket (M80 US Military designation) with a specified mass of 9.6 g (147 gr) and a velocity of 847 m/s±9.1 m/s (2780 ft/s±30 ft/s) were fired at the structure. The two M80 bullets were fired at 2773 and 2775 ft·s$^{-1}$ respectively. Comparing the imaging from the testing with Examples 1 and 2, there was less of a shock-wave observed in the composite structure, and very little rebound wave fronts. The clay back plate and the back face of the structure after the second M80 shot was fired showed considerable damage to the clay behind (completely blown through) and there are distinct bullet exit holes in the back of the structure. This composite structure accordingly failed to prevent passage of the bullets.

Example 3—Testing after Submerging with Water

Testing of the composite material Example 3 was initially carried out under NIJ 0101.06 Level IIIa testing, which it passed. The composite material was then completely submerged (weighed down) for 1 hour in tap water at ambient temperature. The composite was then re-tested under the same NIJ 0101.06 Level IIIa testing protocols. Two bullets were fired at it, one 9 mm full metal jacket roundnose and one .44 Magnum Semi Jacketed Hollow Point bullet.

The water-soaked composite material behaved in a similar fashion to the dry composite. In terms of the 9 mm bullet, shock waves were seen passing across the structure, and with the .44 bullet, significant flexing was observed with a fair bullet strike near the edge of the structure.

The most significant differences were seen with the back-face deformation. With both the 9 mm and .44 magnum bullets on a dry structure, some back-face deformation was evident (2-5 mm). However, with the water-logged structure, the 9 mm bullet showed no back-face deformation and the .44 magnum bullet showed an impression of the stab-proof outer fabric in the clay but no discernible back-face deformation.

Accordingly, in terms of loss in performance following submergence in water that has been reported with some Kevlar based armours, the composite structures according to the present invention actually improve performance when water-logged. The aerogel has a reported water ingress of only 2% by weight, so it is thought that the water must be spatially positioning between the packs of UHMWPE and aerogel composite and must be assisting in the transference of energy across the structure as well as releasing some energy as the water is forced out of the structure on impact.

Although the invention has been described with reference to specific embodiments and examples above, it will be appreciated that modifications can be made to the embodiments and examples without departing from the invention. For example, in the above embodiments, although specific impacts from an object or projectile (e.g. a bullet or a knife) are discussed, it will be appreciated that laminate structures falling within the scope of the invention have application in other environments. For example, the composite structures and articles can be used in safety gear or protective clothing (e.g. as motorbike protective wear or worksite protective clothing) and aerospace applications.

The invention claimed is:
1. A composite structure, comprising:
  a protective structure comprising a plurality of ballistic layers arranged as a stack; and
  an ancillary structure adjacent to the protective structure adapted to at least partly absorb a force acting on the protective structure, wherein the ancillary structure comprises at least one first layer comprising an aerogel arranged to at least partly absorb the force acting on the protective structure; and wherein a first part of each ballistic layer is moveable relative to at least one adjacent ballistic layer and wherein a second part of each ballistic layer is connected to at least one adjacent ballistic layer so as to restrict relative movement of a part of each of the adjacent ballistic layers such that the first part of the ballistic layer can move to a greater degree relative to the at least one adjacent ballistic layer compared to the second part.

2. The composite structure of claim 1, wherein each ballistic layer is connected to at least one adjacent ballistic layer at or adjacent an edge of each ballistic layer.

3. The composite structure of claim 1, wherein each ballistic layer is connected to at least one adjacent ballistic layer at or adjacent the edges of the ballistic layer so as to constrain movement of a part of each layer around the perimeter of each layer.

4. The composite structure of claim 1, wherein the plurality of ballistic layers in the protective structure are formed from a single sheet of ballistic material folded to form a plurality of layers, the folds between layers providing the connection between adjacent ballistic layers.

5. The composite structure of claim 1, wherein the protective structure further comprises a fastening component adapted to connect each ballistic layer to at least one adjacent ballistic layer so as to restrict relative movement of a part of the adjacent ballistic layers.

6. The composite structure of claim 1, wherein all of the plurality of ballistic layers are connected to one another so as to restrict relative movement of a part of all of the ballistic layers in the stack.

7. The composite structure of claim 1, wherein the ballistic layer comprises a ballistic material selected from the group consisting of aramid fibres, aromatic polyamide fibres, boron fibres, ultra-high molecular weight polyethylene, poly(p-phenylene-2,6-benzobisoxazole) (PBO), poly{2,6-diimidazo[4,5-b:4',5'-e]-pyridinylene-1,4 (2,5-dihydroxy)phenylene} (PIPD) or combinations thereof.

8. The composite structure of claim 1, wherein ancillary structure comprises at least one second layer comprising graphene.

9. The composite structure of claim 8, wherein the second layer is a planar layer of graphene.

10. The composite structure of claim 8, wherein the second layer comprising graphene comprises graphene in the form of graphene platelets.

11. The composite structure of claim 8, wherein the ancillary structure comprises a plurality of second layers each comprising graphene; and a plurality of first layers each comprising an aerogel, wherein the first and second layers alternate in the ancillary structure.

12. The composite structure of claim 1, wherein the ancillary structure comprises at least one second layer comprising a polymer.

13. The composite structure of claim 1, wherein the ancillary structure comprises at least one second layer comprising a polymer and graphene.

14. The composite structure of claim 1, wherein the composite structure comprises a plurality of protective structures and a plurality of ancillary structures.

15. The composite structure of claim 1, wherein the first part is unconstrained with respect to the at least one adjacent ballistic layer.

16. A ballistic article comprising:

a protective structure comprising a plurality of ballistic layers arranged as a stack; and an ancillary structure adjacent to the protective structure adapted to at least partly absorb a force acting on the protective structure, wherein the ancillary structure comprises at least one first layer comprising an aerogel arranged to at least partly absorb the force acting on the protective structure; and wherein a first part of each ballistic layer is moveable relative to at least one adjacent ballistic layer and wherein a second part of each ballistic layer is connected to at least one adjacent ballistic layer so as to restrict relative movement of a part of each of the adjacent ballistic layers such that the first part of the ballistic layer can move to a greater degree relative to the at least one adjacent ballistic layer compared to the second part.

17. The ballistic article of claim 16, wherein the ballistic article is a wearable article.

18. The ballistic article of claim 16, wherein the first part is unconstrained with respect to the at least one adjacent ballistic layer.

19. The ballistic article of claim 16, wherein each ballistic layer is connected to at least one adjacent ballistic layer at or adjacent the edges of the ballistic layer so as to constrain movement of a part of each layer around the perimeter of each layer.

* * * * *